June 2, 1964  J. E. LANGENBACH ETAL  3,135,941
RECTILINEAR MOTION VARIABLE RESISTANCE DEVICE
Filed Nov. 30, 1962
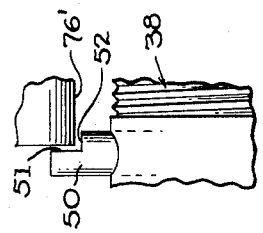
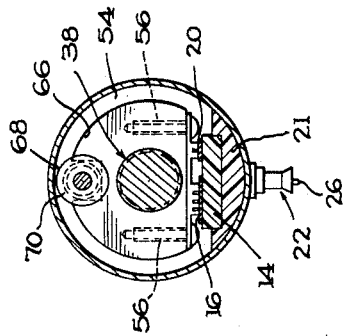
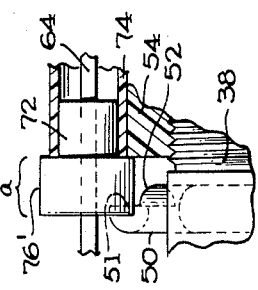
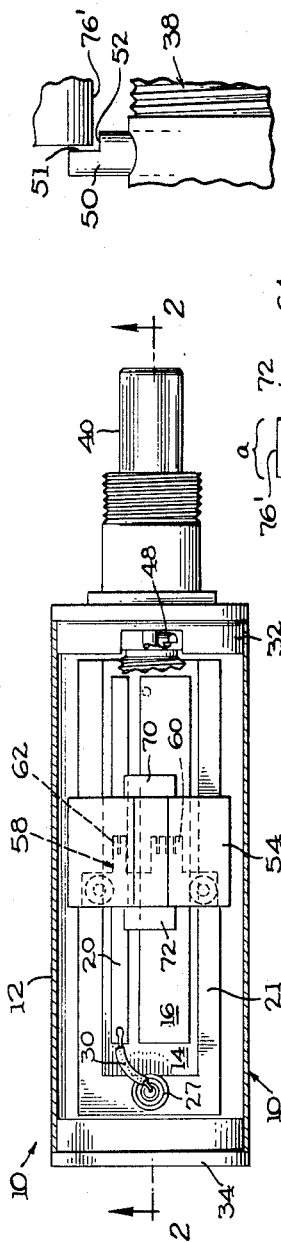
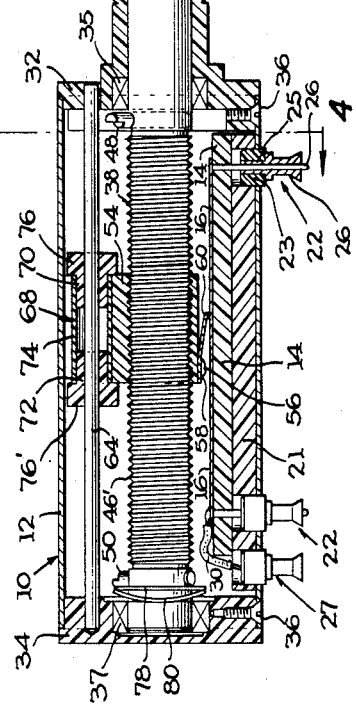
INVENTORS
Jack E. Langenbach
William K. Prill
BY
FERD L. MEHLHOFF and
ROBERT J. STEINMEYER
ATTORNEYS

United States Patent Office 3,135,941
Patented June 2, 1964

3,135,941
RECTILINEAR MOTION VARIABLE
RESISTANCE DEVICE
Jack E. Langenbach, Corona Del Mar, and William K. Prill, Costa Mesa, Calif., assignors to Beckman Instruments, Inc., a corporation of California
Filed Nov. 30, 1962, Ser. No. 241,327
5 Claims. (Cl. 338—180)

This invention relates to variable resistance devices, and more particularly to a rectilinear motion variable resistance or potentiometer having a rotary mechanical input.

In precision potentiometers of the type in which a wiper is moved rectilinearly along a resistance film or the like, it is important that the total excursion of the wiper along the resistance be controlled within precise limits, and where the rectilinear movement of the wiper is produced by a rotary input, it is important that the total degrees of rotation of the mechanical input be capable of precise control.

In precision potentiometers, it is also essential that the electrical angle of the device be repeatable at either end of the wiper travel over the resistance element with reference to the angle of the rotary input shaft, or, expressed in a different way, that the extreme positions of the wiper at opposite ends of its path of travel along the rectilinear resistance element always exactly correspond to certain predetermined positions of the rotary input to the potentiometer.

It is also important that the total mechanical excursion of the wiper along the resistance be capable of adjustment to compensate for tolerances in manufacture or for changes in design requirements.

Another problem which is encountered in the construction of variable resistances or potentiometers having film type resistance elements is that the initial linearity of the resistance elements as "screened" or as "molded" is poor compared to resistance devices using wire wound resistance elements. Accordingly, it is usually necessary to "tailor" the resistance film by grinding or abrading away part of the resistance film. The area to be tailored is typically determined by comparing the linearity of the resistance film with the known linearity of a second potentiometer, where the wipers of the two devices are coupled together and driven simultaneously by a single power source. The difference in resistance or "error signal" is continuously sensed and fed back through amplifiers to position a rotating cutting wheel on the resistance element being tailored. With the increasing trend toward miniaturization of electronic components, potentiometer housings of very small diameter are commonplace and therefore a problem is presented in the grinding or the tailoring of the resistance films previously described unless the resistance elements being tailored are arranged in a manner which renders them accessible for the grinding operation.

Accordingly, it is an object of this invention to provide an improved variable resistance device or potentiometer in which a rectilinear motion is imparted to a wiper member along the resistance element by means of a rotary mechanical input.

It is another object of the invention to provide a rectilinear potentiometer or variable resistance element including a unique means for precisely controlling the total mechanical excursion of the wiper member along the resistance element.

It is another object of the invention to provide a rectilinear potentiometer or variable resistance element having a rotary mechanical input and including a unique stop means for precisely controlling the mechanical excursion of the wiper along the rectilinear resistance element and for similarly controlling the total degrees of rotation of the rotary input which is coupled to the rectilinearly movable wiper.

It is a further object of the invention to provide a rectilinear potentiometer having a rotary mechanical input in which the total number of revolutions of the rotary mechanical input for one complete excursion of the wiper may be pre-set over a wide range.

It is a still further object of the invention to provide a rectilinear potentiometer in which the total mechanical excursion of the wiper over the resistance element may be altered by substitution of a component part of a different dimension.

Still a further object of the invention is to provide a rectilinear potentiometer including a film type resistance element in which the potentiometer is constructed in such manner as to facilitate any necessary "tailoring" or grinding of the film resistance to cause the resistance to have a linear characteristic uniformly throughout its length.

In achievement of these objectives, there is provided in accordance with an embodiment of this invention, a potentiometer including a housing in which is received an insulating base member having positioned thereon a rectilinearly extending resistance film and a parallel conductive film which serves as commutator or return path for a rectilinearly movable wiper assembly of the potentiometer. The wiper assembly is moved along the resistance and commutator films by a traveling nut which is threadedly movable along a rotatable shaft supported by the end caps of the potentiometer housing. In accordance with an important feature of the construction, the nut member is provided with a recess for receiving a replaceable guide and stop assembly which moves along a guide rod extending parallel to the rotatable shaft. The guide and stop assembly includes annular shoulders having peripheral surfaces that are engaged by stop members or pins carried on and rotatable with the threaded shaft. The travel of the traveling nut and wiper assembly in either direction is arrested when one of the annular shoulders of the stop assembly is engaged by a stop pin at either end of the rectilinear path of travel of the traveling nut. The mechanical excursion of the traveling nut and wiper assembly may be controlled within a few degrees of a shaft revolution by providing an annular shoulder of predetermined diameter on one or both ends of the removable stop member of the stop assembly, since the diameter of the annular shoulders of the stop member of the stop assembly controls the linear distance which the traveling nut moves before one of the stop pins engages the peripheral surface thereof at a given end of the potentiometer.

A further feature of the invention is the sub-assembly construction of the potentiometer which permits the resistance film supported by the insulating base to be "tailored" to proper linearity by a grinding or abrading operation prior to assembly of the insulating base into the potentiometer housing.

Further objects and advantages of the invention will become apparent from the following description taken in conjunction with the accompanying drawing in which:

FIG. 1 is a plan view of the device of the invention, with the cover partially removed;

FIG. 2 is a view in longitudinal section taken along line 2—2 of FIG. 1;

FIG. 3 is an enlarged detail view showing the stop bushings of the potentiometer almost engaged with one of the stop pins carried by the rotary shaft of the potentiometer;

FIG. 4 is a view in transverse section along line 4—4 of FIG. 2; and

FIG. 5 is a view similar to FIG. 3 with the shaft rotated almost one additional turn so that the stop pin engages the stop bushing of the potentiometer.

Referring now to the drawing, the potentiometer is generally indicated at 10 and comprises an elongated cylindrical housing 12 which receives on the interior thereof a base member 14 of suitable insulating material which extends for most of the length of the housing. A resistance film 16 extends longitudinally along one side of the upper surface of base 14. Film 16 may be a deposited cermet film, a carbon film, a molded conductive plastic, or other suitable conductive material. A second film 20 of conductive material extends longitudinally on the upper surface of base 14 adjacent the opposite edge thereof and in laterally spaced relation to resistance film 16. Film 20 serves as a commutator or return path from the movable wiper which contacts the resistance film 16, as will be explained more fully hereinafter.

As may best be seen in FIG. 2, insulating base 14 does not rest directly on the upper surface of housing 12 but is supported in the housing by an insulating support 21 which is slightly recessed along the upper surface thereof to receive base 14. As will be noted in FIG. 4, insulating support 21 has a contour on its radially outer surface which conforms to the circular inner surface of housing 12.

In order to establish electrical contact between resistance film 16 and the external circuit, of which the potentiometer forms a part, aligned apertures are provided in housing 12 and in the insulating support 21 adjacent opposite ends of the housing to receive terminals each generally indicated at 22. Each terminal 22 includes an inner bushing portion 23 which is received in the aligned apertures of housing 12 and of insulating support 21, and an outer bushing portion 24 including a shank 25 which is received in inner bushing portion 23. A terminal pin 26 extends through an axial passage in the outer bushing portion 24 of each terminal 22 and through a passage in the insulating base 14 into electrical contacting relation with an end of resistance film 16. Each terminal pin 26 is soldered, or welded, or attached in any other well-known manner, to its respective end of the resistance film 14 to provide a good electrical and mechanical connection for the pin. In addition to establishing an electrical connection from the conductive film 16 to the exterior of the potentiometer housing, the terminal pins 26 serve to positively locate insulating base 14 and insulating support 21 in the potentiometer housing 12 and to restrain members 12, 14 and 21 from rotation relative to each other. A terminal 27, similar to the terminals 22 just described, is received in aligned apertures in housing 12 and insulating support 21 to provide an external connection for the conducting strip or commutator 20. Terminal 27 is connected by a flexible conductor 30 to the conductive film 20.

A front lid or end cap 32 and a rear lid or end cap 34 are secured to the opposite ends of the housing 12 by means of screws 36. The respective end caps are provided with suitable bearings 35 and 37 which support for rotation a shaft generally indicated at 38 having an end 40 which projects beyond the front cap 32 to permit rotation of the shaft from outside of the housing 12.

Shaft 38 is threaded as indicated at 46 for most of the length thereof which is positioned within housing 12. A front stop member or pin 48 and a rear stop member or pin 50 are rigidly secured to shaft 38 adjacent the opposite ends of the shaft lying within housing 12. Each end of shaft 38 is provided with a drilled diametral passage which tightly frictionally receives one of the stop pins 48 or 50. The opposite ends of each stop pin project through diametrically opposed ends of the drilled passage in which the respective stop pin is positioned.

Traveling nut 54 is formed of dielectric material and is internally threaded for engagement with the thread 46 on shaft 38. Nut 54 has affixed to the under surface thereof, by means of screws 56, a wiper assembly, generally indicated at 58, formed of spring metal or the like, and including conductively connected wiper elements 60 and 62 which respectively bear against resistance film 16 and against conductive film or commutator 20.

In order to restrain traveling nut 54 from rotation on shaft 38 and to insure that rotation of shaft 38 produces only linear movement of nut 54, a guide rod 64 extends the entire length of housing 12 and has the opposite ends thereof received in bearing sockets in the front end cap 32 and in the rear end cap 34 respectively.

Referring to FIG. 4, it will be seen that the traveling nut 54 is provided at its upper portion with a saddle-like upwardly open arcuate recess 66 which received detachable stop member or guide bushing and stop assembly generally indicated at 68 which is slidably movable along guide rod 64 as the traveling nut 44 advances along the thread 46 of shaft 38. The guide bushing assembly, as may best be seen in FIG. 2, includes a pair of opposite stop bushings or members 70 and 72 which are respectively received with a tight frictional fit in the opposite ends of a cylindrical guide sleeve or spacer 74. Each of the stop bushings 70 and 72 has at the axially outer end thereof an annular shoulder 76 or 76', respectively, of larger diameter than that of the arcuate recess 66 in the upper portion of traveling nut 44.

The stop bushing assembly 68, including the front and rear stop bushings or members 70 and 72 and the spacer sleeve 74, provides a very convenient means of adjusting the mechanical excursion of the traveling nut 44 along the threaded portion 46 of shaft 38. By selecting stop bushings or members 70 and 72 having an annular shoulder 76 or 76' of a predetermined diameter, the point in the linear movement of nut 44 at which the front and rear rotating stop pins 48 and 50 intersect the annular shoulder 76 or 76' can be controlled to within a degree, or fractional part of a degree, of the rotation of shaft 38.

The manner wherein the stop pins 48 and 50 control the linear travel of the nut 44 can best be understood by reference to FIGS. 3 and 5. It will be noted in FIG. 3, that stop pin 50 is notched, undercut, or otherwise contoured at the outwardly extending end thereof so that the shoulder 76' of the stop bushing is free to pass over the surface 52 of the notched portion of the pin 50 and just passes freely by the inwardly directed flat surface 51 of the pin, which surface is normal to the axis of rotation of the shaft. Thus, in FIG. 3 the annular shoulder 76' is bypassed by the pin 50 on the turn previous to the stop position. As may be seen in FIG. 5, when the shaft 38 is turned approximately one more turn, the amount thereof depending upon the particular diameter of the annular shoulder 76', the shoulder 76' is traversed into a position where it is engaged by the upper end portion of the pin 50.

The relieved, undercut, or notched upper end portion of the stop pin, permits maximum engagement between the stop pin and the peripheral surface of the annular shoulder of the stop member. That is, by notching or undercutting a portion, such as by removing 50 percent of the upper portion of the pin, on the side thereof facing the opposite end of the potentiometer housing then the surface of the pin 50 that engages the peripheral surface of the annular shoulder 76' is approximately tangent to the surface of the annular shoulder at the point of engagement. If the pin were left circular adjacent the outer end thereof, it can easily be understood that the circular surface of the stop pin would engage the front edge of the shoulder 76' and the engaging surface of the pin would be disposed at an acute angle, unless the pitch of the threaded shaft 38 were extremely great. In view of the fact that the pitch of the threads is usually quite small, this would make it extremely difficult to arrive at any accurate stopping point. Furthermore, because of the angular engagement of the two surfaces, the corner or leading edge of the shoulder 76' would wear very quickly making the arresting arrangement very inaccurate. Thus, the undercut or notched stop pin serves to increase the accuracy of this stop means as well as to reduce the wear thereof.

It will be understood that stop pins 48 and 50 can be formed with a surface disposed parallel to the axis of rotation so that it will be unnecessary to undercut the end portion thereof. For example, the outwardly extending portion of the stop pins can be made square or rectangular in shape so that the side surfaces thereof are substantially parallel to the axis of rotation and will therefore engage the side surfaces of the shoulders 76 or 76' of the respective bushings or stop members squarely rather than at an angle. However, inasmuch as cylindrical shaped pins are more easily formed and attached to the shaft 38, the preferred embodiment of the invention envisions the notching or undercutting of the outwardly extending end portion of the cylindrically shaped stop pins 48 and 50. The undercut region of each pin faces respectively the opposite end of the shaft 38 and permits the shoulder 76 or 76' of the respective bushing to be bypassed by the stop pin until there is engagement by the peripheral surface of the pin that is approximately tangent, at the point of contact, to the engaged surface of the shoulder 76 or 76'.

Thus within limits, if, after the assembly of the potentiometer, it is found that the total rotation of shaft 38 is greater or less than the proper value, the diameter of the annular shoulder 76 or 76' can be changed by substitution of a different stop bushing 70 or 72 to vary the point in the linear path of movement of nut 54 at which the peripheral surface of the annular shoulder 76 or 76' is engaged by the corresponding stop pin 48 or 50. Annular shoulders of different diameters will engage at different rotational positions of the respective stop pins and hence at points which have different linear positions with respect to the movement of traveling nut 54.

By the way of example, if the thread pitch and the length of the resistance element were designed for ten revolutions of the shaft 38 to cause the wiper to traverse the resistance film, the specification would be for a 3600 degree rotation of shaft 38. If, after assembly, it were found that the specification was not met because of allowable dimensional tolerances, the rotational angle of the input shaft could be increased by decreasing the diameter of the bushing shoulder 76 or 76'. Conversely, the rotational angle of the input shaft could be decreased by increasing the diameter of the bushing shoulder or shoulders 76 or 76'.

It is also possible to phase the electrical rotation and mechanical rotation angles by utilizing front and rear bushings 48 and 50 with dissimilar shoulder diameters. That is, it may be desirable to adjust within limits the particular point at each end of the resistance film at which the wiper is to stop. By varying the diameter of the particular stop bushing shoulder 76 or 76', it is possible to adjust within small limits the position of the wiper. It is also possible to accomplish a greater variation in this dimension, or accomplish control up to a number of complete turns of the shaft 38, merely by varying the axial length, or the length designated "a" in FIG. 5, of the particular bushing shoulder. This along with the possible variations in shoulder diameters permits great flexibility of design for making the linear travel of the wiper very accurate.

In assembling the potentiometer hereinbefore described, the base 14, having the resistance film 16 and the conductive film 20 thereon and with the terminal pins 26 and terminal 28 connected thereto, along with the insulating support 21 are inserted into the housing 12. Terminal studs 22 have previously been attached to the housing 12 and the terminal pins 26 are inserted through the terminal studs 22. The pins 26 and terminal connection 28 are then welded or brazed to the terminal studs 22 for good electrical and mechanical connections. The terminal pins 26, passing through the termials 22 and through the base 14 and insulating support 21, serve to anchor the base 14 and the support 21 against rotation in housing 12. The flexible conductor lead 28 is connected between the conductive film or commutator 20 and the external terminal 27 of the commutator. The assembled components just described comprise the "housing sub-assembly."

Prior to having been positioned in housing 12 as just described, resistance film 16 is checked for linearity against a known resistance and is ground or abraded to correct any nonlinearity, as previously described.

The second sub-assembly comprises the front lid or cap 32, the front bearing 35, the shaft 38, the traveling nut 54 with wiper assembly 58 attached to the under surface thereof, and the front stop pin 48 and rear stop pin 50 carried by shaft 38.

A third sub-assembly comprising the guide rod 64, the stop bushings 70 and 72, and the guide sleeve 74, is loosely attached to the second sub-assembly by inserting stop bushings 70 and 72 into the spacer or guide sleeve 74, nesting the assembled members 70, 72, 74 into the saddle-like recess 66 of the traveling nut 54, and then inserting guide rod 64 through the assembled stop bushing assembly 58 and into a bearing hole provided in the front cap or lid 32. The housing sub-assembly is then positioned over the shaft sub-assembly formed by the combined second and third sub-assemblies, and is attached by means of screws 36 to the front lid 32.

Closing of housing 12 is accomplished by first placing a thrust washer 78 and a bowed washer 80 over the end of shaft 38 to restrict axial motion of the shaft. The rear lid 34 with rear bearing 37 inserted therein is positioned over the end of the shaft, and the guide rod 64 is received in a bearing hole provided in the rear lid. The rear lid is then removably attached to the housing 12 by means of screws 36 which also serve to position the rear lid 34 with respect to the front lid 32 so that alignment of the guide rod 64 is accomplished.

Rotation of shaft 38 produces a rectilinear motion of the traveling nut 54 since the nut is restrained from significant rotary motion by the presence of the bushing assembly 68 nested in the saddle-like recess 66 of nut 54, and, as a result, rectilinear motion of the traveling nut along the threaded region 46 of shaft 38 is achieved. Rectilinear motion of nut 54 also results in a rectilinear motion of wiper assembly 58 which is attached to the under surface of the nut and which is biased into conductive contact with the resistance film 16 and the conductive film or commutator 20.

The radius of the shoulders 76 and 76' of the guide or stop bushings 70 and 72 is greater than the radius of the saddle-like recess 66 of the traveling nut 54. The guide rod 64 is restrained from significant radial motion by the front and rear lids 32 and 34 and therefore the rectilinear motion of the traveling nut 54 is transmitted to the guide and stop bushing assembly 68 which is free to slide along the guide rod 64. As the guide bushing assembly approaches either end of the potentiometer, one of the stop bushings 70 or 72 will be struck by one of the stop pins 48 or 50 attached to and rotating in unison with shaft 38, thus stopping rotary motion of the shaft and rectilinear motion of the traveling nut 54.

For a given length of wiper travel, the number of shaft revolutions may be varied within limits by appropriate selection of the pitch of thread 46 on shaft 38. The exact length of wiper travel may also be controlled within a degree, or fraction thereof, of a shaft revolution by changing the diameter of one or both of the bushing shoulders 76 or 76' merely by substitution of different bushings 70 and 72 having the required shoulder diameter.

It can be seen from the foregoing that the potentiometer hereinbefore described has great utility since it permits precise control and presetting of the mechanical excursion of the wiper assembly along the resistance film and permits precise adjustment of the travel of the wiper assembly to compensate for any variations from specifications due to allowable tolerances in manufacture of the potentiometer.

Furthermore, the potentiometer construction hereinbefore described provides an accessible arrangement of the resistance element which permits grinding of the resistance film to obtain proper linearity of the resistance prior to the assembly of the resistance element into the potentiometer housing.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What we claim as our invention is:

1. A variable resistance device comprising a housing, an insulating support within said housing, a rectilinearly-extending resistance element carried by said support, a shaft extending lengthwise of said housing and supported for rotation therein, said shaft being threaded for a substantial portion of its length, a traveling nut in threaded engagement with said shaft, wiper contact means carried by and movable with said traveling nut and in wiping contact with said resistance elements, guide means engaging said nut to prevent rotation thereof whereby rotation of said shaft linearly advances said nut along the thread of said shaft, a stop pin extending outwardly from said shaft adjacent an end of said shaft, said stop pin having a circular cross-section and having the outwardly extending portion thereof notched transversely on the surface facing the opposite end of said shaft, and a detachable stop member carried by said traveling nut, said stop member adapted to ride over the notched portion of said stop pin thereby to be engaged by the outer surface of said unnotched portion of said stop pin as said stop pin is rotated by said shaft against the side of said stop member thereby to limit movement of said nut and said wiper contact means in a given direction of travel of said shaft, the point at which linear movement of said nut is arrested depending on the point at which said detachable stop member is engaged by the outer surface of said stop pin beyond the notched portion thereof during rotation of said pin by said shaft, said stop member providing adjustment of the relative stopping position of said traveling nut by being replaceable by stop members of varying dimensions.

2. A variable resistance device comprising a housing, an insulating support within said housing, a rectilinearly-extending resistance element carried by said support, a shaft extending lengthwise of said housing and supported for rotation therein, said shaft being threaded for a substantial portion of its length, a traveling nut in threaded engagement with said shaft, wiper contact means carried by and movable with said traveling nut and in wiping contact with said resistance element, guide means engaging said nut to prevent rotation thereof whereby rotation of said shaft linearly advances said nut along the thread of said shaft, said traveling nut including a recess therein for receiving a detachable sleeve member which extends parallel to said shaft, a detachable coaxial stop member received in said sleeve member, said stop member including an annular-shoulder thereon extending an axial distance from said sleeve member, a stop pin carried by and rotatable with said shaft adjacent an end of said shaft, said stop pin extending outwardly from said shaft and having the outer end portion thereof undercut on the side thereof facing the opposite end of said shaft, said undercut portion of said pin adapted to pass under said annular shoulder of said stop member so that the portion of said stop pin beyond the undercut portion thereof engages said stop member and limits movement of said nut and said wiper contact means in a given direction of travel of said shaft.

3. A variable resistance device comprising a housing, an insulating support within said housing, a rectilinearly-extending resistance element carried by said support, a shaft extendingl engthwise of said housing and supported for rotation therein, said shaft being threaded for a substantial portion of its length, a traveling nut in threaded engagement with said shaft, wiper contact means carried by and movable with said traveling nut and in wiping contact with said resistance element, guide means engaging said nut to prevent rotation thereof whereby rotation of said shaft linearly advances said nut along the thread of said shaft, separate stop pins extending outwardly from and rotatable with said shaft and located adjacent opposite ends of said shaft, each of said stop pins having an undercut portion adjacent the outer end thereof and facing the central portion of said shaft, said traveling nut including a recess therein for receiving a detachable sleeve member which extends parallel to said shaft, detachable stop bushings received in opposite ends of said sleeve member, each of said stop bushings including an annular shoulder adapted to ride over said undercut portions of said stop pins to be engaged by the uncut portion of said stop pins thereby to limit movement of said nut and said wiper contact means in a given direction of travel of said nut, the extent of the linear movement of said nut depending on the points at which said annular shoulders of said detachable stop bushings engage said respective stop pins on said shaft.

4. A potentiometer comprising a housing, an insulating support within said housing, rectilinearly-extending resistance and conductor elements carried by said support in laterally spaced relation to each other, a shaft extending lengthwise of said housing and supported for rotation therein, said shaft being threaded for a substantial portion of its length, a traveling nut in threaded engagement with said shaft, wiper contact means carried by and movable with said traveling nut and in wiping contact with said resistance and conductor elements, guide means engaging said nut to prevent rotation thereof whereby rotation of said shaft linearly advances said nut along the thread of said shaft, a detachable stop member carried by said travelling nut, a stop pin carried by and rotatable with said shaft adjacent an end of said shaft, said stop pin having a stop surface in a plane substantially parallel to the axis of rotation of said shaft and extending to a point whereat said parallel surface of said stop pin first engages said stop member thereby to limit rotation of said shaft and linear movement of said nut and said wiper contact means in a given direction of travel of said nut, the point at which linear movement of said nut is arrested depending on the point at which said detachable stop member engages said parallel surface of said stop pin during rotation of said shaft.

5. A potentiometer comprising a housing, an insulating support within said housing, a recilinearly-extending resistance and conductor elements carried by said support in laterally spaced relation to each other, a shaft extending lengthwise of said housing and supported for rotation therein, said shaft being threaded for a substantial portion of its length, a traveling nut in threaded engagement with said shaft, wiper contact means carried by and movable with said traveling nut and in wiping contact with said resistance and conductor elements, guide means engaging said nut to prevent rotation thereof whereby rotation of said shaft linearly advances said nut along the thread of said shaft, separate stop pins extending outwardly from opposite ends of said shaft and rotatable therewith, each of said stop pins having a side surface that is substantially parallel to the axis of rotation of said shaft and an inwardly facing surface that is normal to said side surface, said traveling nut including a recess therein for receiving a detachable sleeve member which extends parallel to said shaft, and detachable stop members on opposite ends of said sleeve member, each of said stop members including an annular shoulder having a side surface adapted to be engaged by said parallel side surface of one of said stop pins to thereby limit rotation of said shaft and movement of said nut and said wiper contact means in a given direction of travel of said nut, the point at which linear movement of said nut is arrested depending on the point at which said shoulder of said stop member engages said parallel side surface of the respective stop pin.

References Cited in the file of this patent

UNITED STATES PATENTS

| | | |
|---|---|---|
| 2,871,326 | Weidenman | Jan. 27, 1959 |
| 2,900,614 | Gach et al. | Aug. 18, 1959 |
| 2,932,808 | Bourns et al. | Apr. 12, 1960 |
| 2,999,995 | Bourns et al. | Sept. 12, 1961 |
| 3,050,704 | Dickenson et al. | Aug. 21, 1962 |